US007177845B2

(12) United States Patent
DeTreville

(10) Patent No.: US 7,177,845 B2
(45) Date of Patent: Feb. 13, 2007

(54) COPY DETECTION FOR DIGITALLY-FORMATTED WORKS

(75) Inventor: John D. DeTreville, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 13 days.

(21) Appl. No.: 11/018,022

(22) Filed: Dec. 20, 2004

(65) Prior Publication Data

US 2005/0108174 A1    May 19, 2005

Related U.S. Application Data

(63) Continuation of application No. 09/451,253, filed on Nov. 29, 1999, now Pat. No. 6,868,405.

(51) Int. Cl.
*G06F 17/60* (2006.01)
(52) U.S. Cl. ............................. 705/57; 705/1; 705/56; 705/58; 380/293; 713/1
(58) Field of Classification Search ................ 705/1, 705/56, 57, 58; 380/293; 713/1
See application file for complete search history.

(56) References Cited

U.S. PATENT DOCUMENTS

| 4,136,395 | A | | 1/1979 | Kolpek et al. |
|---|---|---|---|---|
| 5,142,662 | A | | 8/1992 | Gump et al. |
| 5,390,297 | A | | 2/1995 | Barber et al. |
| 5,619,571 | A | | 4/1997 | Sandstrom et al. |
| 5,638,443 | A | * | 6/1997 | Stefik et al. |
| 5,757,915 | A | * | 5/1998 | Aucsmith et al. ............ 713/187 |
| 5,765,152 | A | | 6/1998 | Erickson |
| 5,781,629 | A | | 7/1998 | Haber et al. |
| 5,818,933 | A | | 10/1998 | Kambe et al. |
| 5,832,208 | A | | 11/1998 | Chen et al. |
| 5,956,034 | A | * | 9/1999 | Sachs et al. ................ 715/776 |
| 5,986,690 | A | | 11/1999 | Hendricks |
| 5,987,525 | A | | 11/1999 | Roberts et al. |
| 5,995,623 | A | | 11/1999 | Kawano et al. |
| 6,012,890 | A | | 1/2000 | Celorio Garrido |

(Continued)

FOREIGN PATENT DOCUMENTS

EP    1 041 767    10/2000

(Continued)

OTHER PUBLICATIONS

ElCommsoft EBook Security—Theory and practice, Jul. 2001 (Author unknown).*

(Continued)

*Primary Examiner*—James A. Reagan
*Assistant Examiner*—John M. Winter
(74) *Attorney, Agent, or Firm*—Lee & Hayes, PLLC

(57) ABSTRACT

An electronic book reader has a processor, a display surface, and access to a memory card upon which is stored a digitally-formatted creative work such as a book. In addition, the reader has access to a plurality of precompiled condensed content descriptions of respective books that are subject to copy restrictions. Before reading a given book, the reader creates a condensed content description of the book and compares it to the stored descriptions to determine whether the book is subject to copy restrictions. If it is, the reader checks for a valid license before allowing the user to read the book.

15 Claims, 2 Drawing Sheets

U.S. PATENT DOCUMENTS

| | | |
|---|---|---|
| 6,052,717 A | 4/2000 | Reynolds et al. |
| 6,119,108 A | 9/2000 | Holmes et al. |
| 6,161,183 A * | 12/2000 | Saito et al. ............... 713/176 |
| 6,289,450 B1 * | 9/2001 | Pensak et al. ............. 713/167 |
| 6,301,660 B1 * | 10/2001 | Benson ..................... 713/165 |
| 6,314,518 B1 | 11/2001 | Linnartz |
| 6,356,287 B1 | 3/2002 | Ruberry et al. |
| 6,385,596 B1 | 5/2002 | Wiser et al. |
| 6,388,957 B2 | 5/2002 | Yankowski |
| 6,470,333 B1 | 10/2002 | Baclawski |
| 6,496,802 B1 | 12/2002 | Van Zoest et al. |
| 6,577,735 B1 | 6/2003 | Bharat |
| 6,594,686 B1 | 7/2003 | Edwards et al. |
| 6,735,699 B1 | 5/2004 | Sasaki et al. |
| 6,766,305 B1 | 7/2004 | Fucarile et al. |
| 6,868,405 B1 | 3/2005 | DeTreville |
| 6,868,494 B1 | 3/2005 | Shitara et al. |
| 6,873,975 B1 | 3/2005 | Hatakayame |
| 6,915,425 B2 | 7/2005 | Xu et al. |
| 2001/0041989 A1 | 11/2001 | Vilcauskae |
| 2001/0051996 A1 | 12/2001 | Cooper et al. |
| 2002/0152262 A1 | 10/2002 | Arkin et al. |

FOREIGN PATENT DOCUMENTS

| | | |
|---|---|---|
| JP | 1041767 A2 * | 4/2000 |

OTHER PUBLICATIONS

Broder, Glassman, Mansse and Zweig, "Syntactic Clustering of the Web", Digital SRC Technical Note, Jul. 1997, pp. 1-14.

Andrei Broder, "On the resemblance and containment of documents", Digital SRC, pp. 1-9.

Brin, Davis, and Garcia-Molina, "Copy Detection Mechanisms for Digital Documents", Stanford University, Dept. of Computer Science, 1995, pp. 1-12.

Shivakumar and Garcia-Molina, "Building a Scalable and Accurate Copy Detection Mechanism", Stanford University, Dept. of Computer Science, 1996, pp. 1-9.

Open eBook Publication Structure 1.0, Sep. 16, 1999, all pages.

* cited by examiner

COPY DETECTION FOR DIGITALLY-FORMATTED WORKS

CROSS REFERENCE TO RELATED PATENT APPLICATION

This is a continuation of and priority is claimed to U.S. patent application having Ser. No. 09/451,253 and a filing date of Nov. 29, 1999 now U.S. Pat. No. 6,868,405 for COPY DETECTION FOR DIGITALLY-FORMATTED WORKS of DeTreville. This United States Patent Application is commonly assigned herewith and is hereby incorporated herein by reference for all that it discloses.

TECHNICAL FIELD

This disclosure relates to the electronic distribution of books and other information and/or entertainment media, and to ways of detecting and preventing violations of copy restrictions on such media.

BACKGROUND

The threat of so-called "pirating" of digitally-formatted works has been a significant obstacle to the adoption and widespread use of the Internet for distribution of media such as books, musical works, and motion pictures. Although such network distribution would at first glance seem ideal for these media, which are easily represented in electronic format, there has been no easy way to prevent widespread copying of such works once they are introduced on the public network. In many cases, one person will buy a legitimate copy and then distribute further copies to friends and others without any further payments to the publisher. This threatens the financial well-being of the publishers, and makes them very reluctant to introduce their works on the Internet.

One approach to solving this problem is to provide content protection mechanisms. For example, songs might be distributed encrypted, with the decryption key hidden from the user.

Encryption, however, does not completely solve the problem. Rather, it merely makes the original content more difficult to recover. Even in the face of encryption, a user might discover the decryption key and distribute the original work, unencrypted. Even more simply, a song might be captured after it is decrypted and converted to analog, resulting in only a small reduction in quality. Similarly, a digitally-formatted book might be viewed and simultaneously retyped to create a new, unencrypted version of the book.

With video and audio, some progress has been made in the use of so-called "watermarking," in which a known pattern of digital "noise" is introduced to the sequential samples of a digital data stream. The amplitude of this noise is designed to be quite small, so that it does not degrade the audio or video quality in any perceivable way.

Through the user of watermarks, publishers can verify their ownership of given works. In addition, different watermarks can be used with different copies of the same work, thereby allowing the publisher to trace a pirated work back to its original source.

Although watermarking can be effective with audio and video, it is not easily adaptable to text. This is because text generally becomes unreadable in the presence of even the smallest noise in the data representing the text—a 1-bit noise element changes a given letter to a completely different letter. Although there is some redundancy in formatted text—for instance, in the formatting itself—such redundancy can be easily removed and reinserted, meaning that it is not useful for holding watermarks. Thus, watermarking has not been used successfully in conjunction with textual works.

Furthermore, it is not well understood the extent to which watermarking—even in audio and video—can be overcome by simply playing the original work in analog format and re-recording the work from the analog presentation. Such an attack may have the potential to erase or otherwise degrade the watermark.

Another method of detecting copy violations involves actually searching the Internet for documents containing significant portions of protected works. This can be facilitated by the use of so-called "sketches" of textual matter, described in an article entitled "Syntactic Clustering of the Web," by Andrei Broder, Steve Glassman, Mark Manasse, and Geoffrey Zweig, in *Proceedings of the Sixth International World Wide Web Conference*, April, 1997, pages 391–404. Using this scheme, a sketch is prepared of each work that is to be protected. A sketch is simply a list of hash values, wherein each hash value is created based on a different textual string of the base text. Each such string preferably encompasses a number of words, such as a sentence, paragraph, or some arbitrary number of characters. In the embodiment described in the article, a document is broken into a number of overlapping text segments or substrings, and a hash is calculated for each segment. The twenty smallest hash values are then chosen, and stored to create a sketch. Sketches of documents found on the Internet are then compared with the sketches of the works to be protected to determine whether some are substantially the same. Documents and works are considered the same if more than a given number of their twenty hash values match.

Although "sketches" such as described above allow a more efficient comparison of documents, the described method still requires that potentially violating works either be known ahead of time, or that the publisher undertake costly Internet searching. Furthermore, this method makes it impossible to find illegal copies that are not visible in an Internet search-such as copies that are e-mailed rather than distributed on publicly accessible Internet sites.

The scheme described below addresses some of the shortcomings of these prior methods, in a system that is effective and easy to implement.

SUMMARY

The "Detailed Description" section below describes an exemplary embodiment of an electronic readers such as is used to read digitally-formatted books. Each reader stores a plurality of precompiled condensed content descriptions, corresponding to books subject to copy restrictions. In conjunction with reading a book, the reader creates a condensed content description of the book and compares it to the stored descriptions to determine whether the book is subject to copy restrictions. If the book is subject to copy restrictions, the reader determines whether the book is authorized.

In the described embodiment, the precompiled condensed content descriptions are downloaded periodically from a distribution server, preferably in conjunction with the purchase and downloading of new digitally-formatted books. Each reader stores a small subset of the available descriptions, which is updated with each new download.

DETAILED DESCRIPTION

Figure 1:
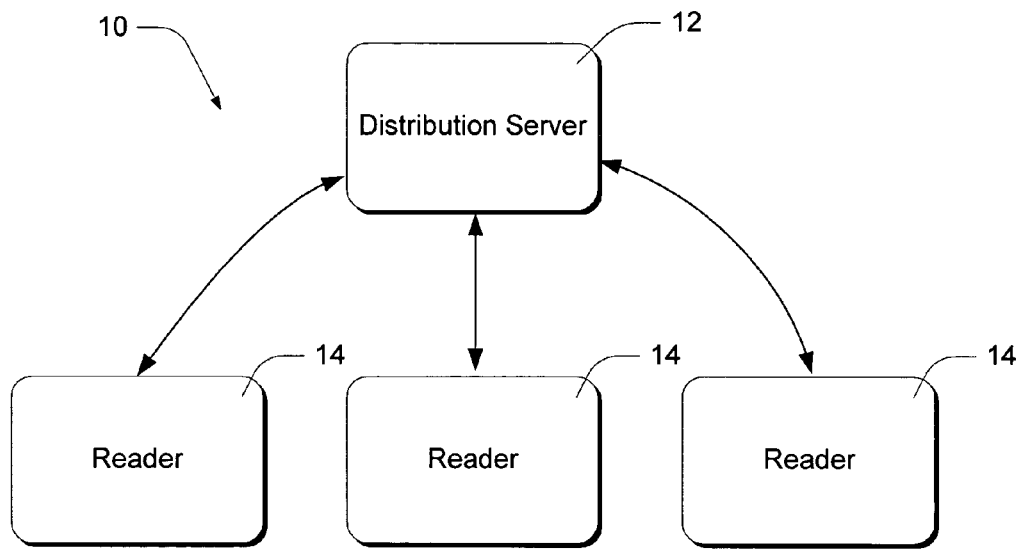
FIG. 1 is a block diagram of an electronic book distribution system.

FIG. 1 shows an exemplary embodiment of an electronic book distribution system 10. System 10 includes a distribution server 12 and a plurality of electronic readers 14 for reading digitally-formatted books or other creative works. The book readers communicate with distribution server 12 through an electronic network such as the Internet, some other public network, or through a private or proprietary network. Generally, books or other works are downloaded to a reader 14 and are then rendered in a format suitable for perception by a user—usually in an audio or visual format.

Figure 2:
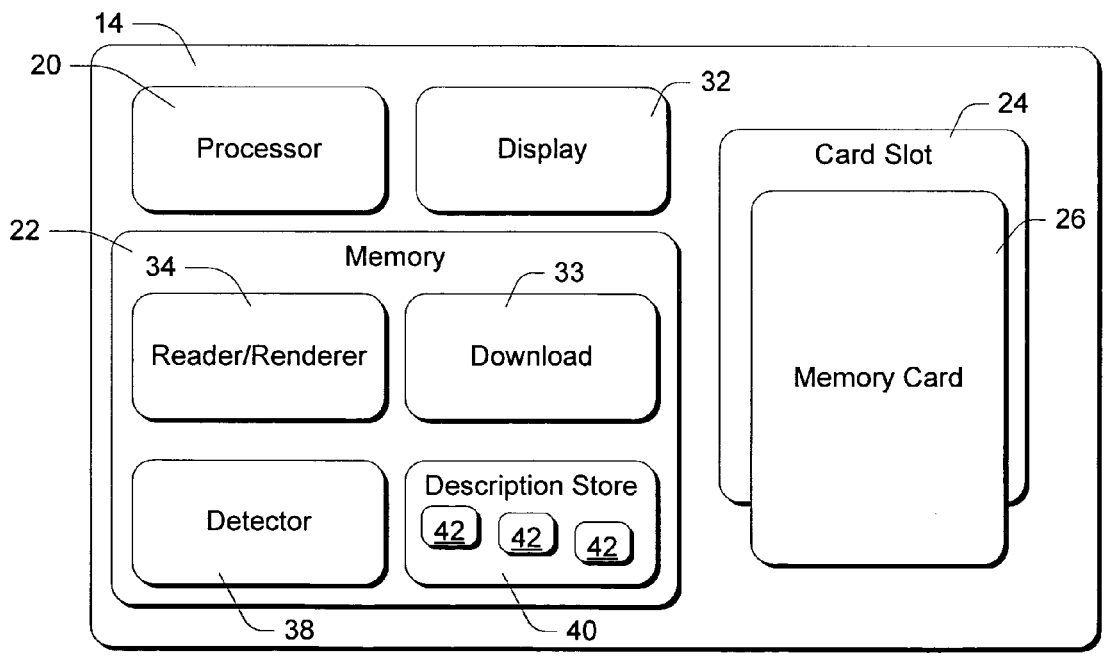
FIG. 2 is a block diagram of an exemplary book reader.

FIG. 2 shows the most pertinent components of an exemplary book reader 14. The book reader has one or more processors 20 and associated memory 22. The memory might include RAM, ROM, and various other types of memory such as flash memory and/or EEPROM (electrically-erasable programmable read-only memory). Generally, memory 22 contains program instructions that are executed by processor 20, as well as volatile state information used during execution of the program instructions.

Book reader 14 also has a book memory receptacle or slot 24, which receives a book memory card 26. The book memory card 26 has non-volatile memory for storing the text of one or more digitally-formatted books.

Memory card 26 is preferably a so-called "smart-card," which has its own intelligence (such as an internal microprocessor) for securing its contents and performing other security-related tasks such as signing, authentication, encryption, and decryption. A smart-card is also physically protected so that its contents cannot easily be ascertained by physical disassembly and/or reverse engineering.

Textual works are downloaded to memory card 26 from distribution server 12 in one of several different ways. In one embodiment, the memory card is inserted in memory receptacle 24 and downloading of digitally-formatted books is performed under the supervision of book reader 14, perhaps over the Internet. In another embodiment, the memory card is inserted in the receptacle of a public computer terminal or kiosk, which performs the download and stores the downloaded book on the memory card. This might involve the Internet, or the download might be performed over a private communications infrastructure.

In most cases, the book will be downloaded only after some sort of electronic payment, typically in the form of a credit card payment or electronic cash payment.

The security features of the smart-card are used during the download to ensure that the book is in fact being downloaded into a smart card that is physically protected, and to restrict multiple downloads of the same book, for the same payment, to the same smart card.

In addition, a digital license is downloaded along with the digitally-formatted book, indicating the existence of a valid license permitting the downloaded work to be rendered from the specific memory card currently in use. This license is verified at playback time by rendering software, in conjunction with the security features of the memory card.

A plurality of different digitally-formatted books can be stored on a single memory card. In the described embodiment, the books are unencrypted on memory card 26.

Book reader 14 has book reader software comprising several software components. Such components are indicated in FIG. 2 as residing within memory 22. Although illustrated as being discrete, these components can be implemented in a common program structure in accordance with accepted programming techniques. The components thus comprise instruction sequences that are executed by processor 20, so that the processor itself ultimately performs the functions described as being implemented by the software components.

Generally, the reader software is designed to read digitally-formatted books from different memory sources and to present them to a user in a user-perceivable format. In the illustrated embodiment, the digitally-formatted works are so-called "electronic books," and therefore contain grammatical text. Books such as this are rendered in a visual format, simulating the appearance of a printed book. Book reader 14 has a display surface 32 upon which the books are displayed.

In the illustrated embodiment, books are downloaded by a download component 33. Reading and rendering books is performed by a rendering component 34. The rendering component is capable of reading digitally-formatted books from memory card 26 and from other memory locations.

The reader software also includes a detection component 38 that checks books to determine whether they are subject to copy restrictions. This is accomplished with reference to a description data store 40, residing within memory 22 or memory card 26. Data store 40 contains a plurality of precompiled condensed content descriptions 42. Each such condensed content description corresponds to a book that is subject to copy restrictions.

In the described embodiment, each condensed content description is a "sketch" as described above in the "Background" section of this document. Generally, the description corresponding to any given work comprises a list of hash values. The hash values are calculated in a way that allows comparison of ordered word sequences in the digitally-formatted works. More specifically, each hash value is calculated from a portion of the corresponding work, such as a sentence, paragraph, or some other arbitrary phrase, excerpt, segment, or sequence of words found in the work. These portions preferably overlap each other. In the described embodiment, a hash value is calculated for every possible 100-character sub-string of the work. For a work containing 2500 characters, this would result in 2401 different sub-strings and corresponding hash values. Of these, the twenty smallest hash values are chosen and stored as the condensed content description. Each work is preferably canonicalized prior to calculating the hash values, such as by removing punctuation and extra spaces, and by converting all letters to lower case. The hash function can be changed over time to provide further security.

Prior to rendering a digitally-formatted book, detection component 38 creates a condensed content description of the book in accordance with the scheme described immediately above. It then compares the description with the stored descriptions in data store 40. If the newly-created description matches any of the stored descriptions, the work is identified as one that is subject to copy restrictions or protections. A "match" is declared if at least some specified fraction (e.g., 75%) of the hash values of the created description are also found in the stored description.

The stored content descriptions can be placed in data store 40 during manufacture of book reader 14. Alternatively, the descriptions can be periodically downloaded or updated from distribution server 12. Such periodic updating is preferably performed in conjunction with the purchase of new electronic books—while downloading the new books to memory card 26. This technique, which is preferably transparent to the user, allows different descriptions to be downloaded to different readers, and for the descriptions to be changed from one download to the next.

Distribution server 12 maintains a large number of precompiled condensed content descriptions. However, only a subset of these descriptions is stored by any given book reader at any given time. Thus, although each book reader might store on the order of 100 descriptions, this is only a small fraction of the overall number of books for which protection is sought. Nevertheless, the probability that a widely distributed stolen book will eventually be spotted by some significant number of electronic readers is still quite high. Providing different descriptions with each new download increases this probability. Preferably, the downloaded subset of descriptions will focus on more popular books, and will therefore change with time. As another alternative, publishers might be charged for having their books included in current downloaded subsets.

If a content description of a book matches one of the stored content descriptions, the electronic book reader verifies that the book is an authorized copy. This is accomplished by determining whether the book is accompanied by a valid digital license, corresponding to the memory card on which the book resides. If such a license exists, the reader allows the user to read the book without interruption. If there is not such a license, however, the electronic book reader takes some sort of action designed either to prevent the user from reading the book or to report the unauthorized book to the original publisher.

In the described embodiment, the reader simply notifies the user of an unauthorized copy and asks the user to report the incident to the publisher. This is accompanied by a promise of some sort of reward, such as a free authorized copy of the book, entry into a drawing, etc. The user is then allowed to read the book, even though it is an unauthorized copy.

Figure 3:
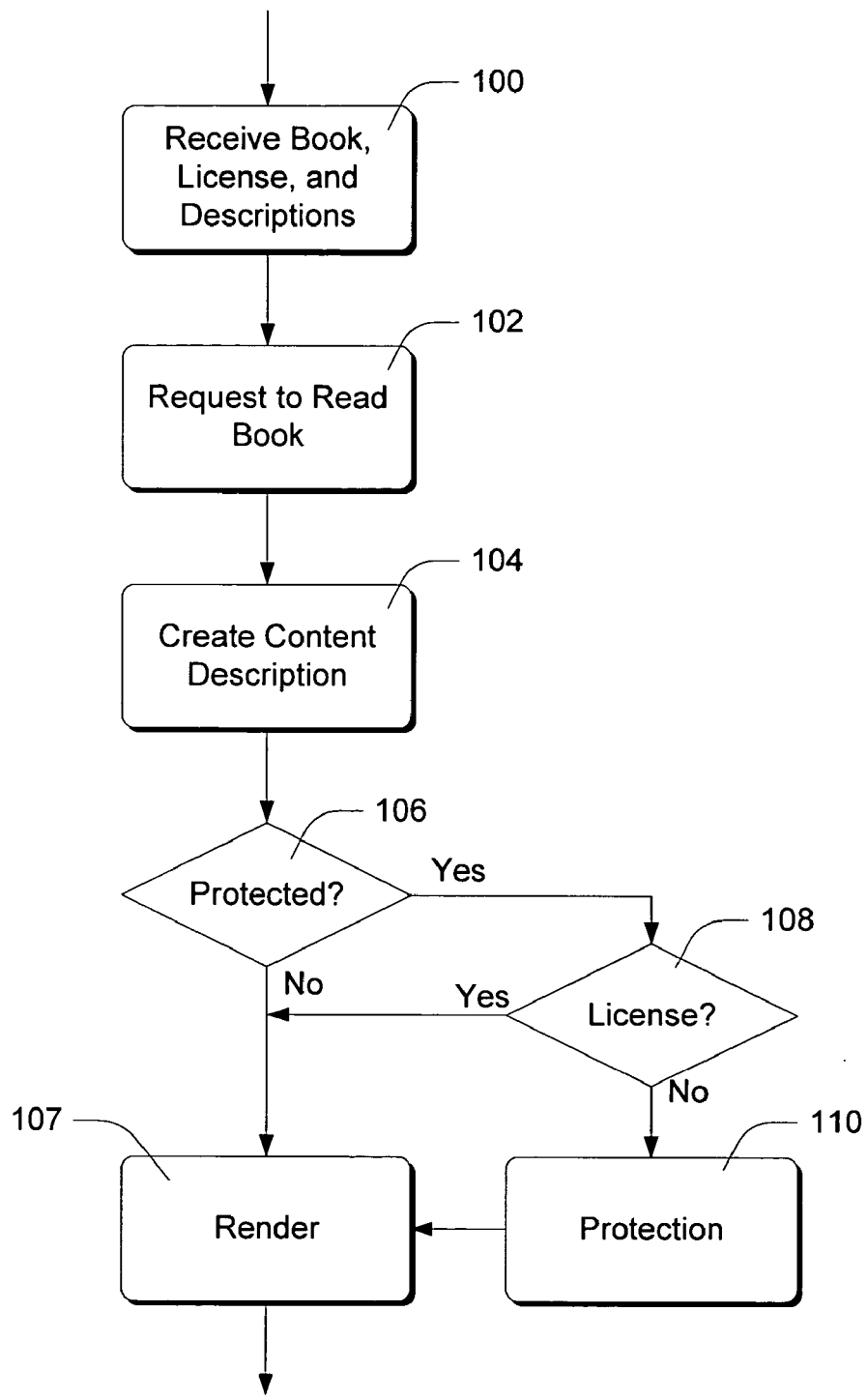
FIG. 3 is a flowchart showing acts performed by the book reader of FIG. 2.

FIG. 3 shows steps performed by reader 14 in accordance with the described embodiment. Step 100 comprises receiving a digitally-formatted book from an authorized source, along with a digital license and one or more condensed content descriptions. These received components are stored as described above.

Step 102 indicates a request by a user to read a particular book.

Step 104 comprises creating a condensed content description for the book which has been requested. Step 106 comprises comparing this newly-created description with any stored descriptions to determine whether the book is subject to copy restrictions. If there is no match, the book is rendered in a step 107. If there is a match, the electronic reader checks for a valid license in a step 108. If there is a valid license, the book is rendered in step 107. Otherwise, if there is no valid license, protection measures are performed in a step 110. In the described embodiment, the protection measures comprise notifying the user and requesting a voluntary report regarding the unauthorized book. More stringent measures might be taken in other embodiments.

The methods and systems described above provide a significant benefit in the detection of unauthorized electronic books and other digital works that are susceptible to condensed descriptions similar to those described above. One advantage of the described embodiment is that it allows books to be distributed in an unencrypted or lightly encrypted format, while still enforcing copy protections. Furthermore, the described method is able to detect stolen copies even when such copies have been reproduced without electronic copying, such as by completely retyping a book. Furthermore, the original book need not even be a digitally-formatted book—the condensed descriptions can be of books whose only authorized versions are printed.

In compliance with the statute, an embodiment of the invention has been described in language more or less specific as to structural and methodical features. It is to be understood, however, that the scope of this patent is not necessarily limited to the specific features described. Rather, the invention is claimed in any of its forms or modifications within the proper scope of the appended claims appropriately interpreted in accordance with the doctrine of equivalents.

The invention claimed is:

1. One or more computer readable media having stored thereon a plurality of instructions that, when executed by one or more processors, causes the one or more processors to perform acts comprising:
    receiving precompiled condensed content descriptions of digitally-formatted works that are subject to copy restrictions;
    in conjunction with reading a particular digitally-formatted work for perception by a user, creating a condensed content description of said particular digitally-formatted work; and
    comparing the created condensed content description to the precompiled condensed content descriptions to determine whether said particular digitally-formatted work is subject to copy restrictions.

2. One or more computer readable media as recited in claim 1, wherein the condensed content description corresponding to any given digitally-formatted work is a list of hash values, each hash value being calculated from a portion of the given digitally-formatted work using a hash function, the method further comprising changing the hash function over time.

3. One or more computer readable media as recited in claim 1, wherein:
    the digitally-formatted works contain grammatical text;
    the condensed content: description corresponding to any given digitally-formatted work is a list of hash values; and
    each hash value is calculated from a sequence of words that occurs in the given digitally-formatted work.

4. One or more computer readable media as recited in claim 1, wherein:
    the digitally-formatted works contain grammatical text;
    the condensed content description corresponding to any given digitally-formatted work is a list of hash values;
    each hash value is calculated from a sequence of words that occurs in the given digitally-formatted work; and
    each sequence of words contains at least 100 characters.

5. One or more computer readable media as recited in claim 1, wherein:
    the digitally-formatted works contain grammatical text;
    the condensed content description corresponding to any given digitally-formatted work is a list of hash values; and
    the hash values are calculated in a way that allows comparison of ordered word sequences in the digitally-formatted works.

6. A computing system comprising:
one or more processors;
one or more computer-readable media;
computer-readable instructions on the one or more computer-readable media which, when executed by the one or more processors, cause the one or more processors to:
receive precompiled condensed content descriptions of digitally-formatted works that are subject to copy restrictions;
in conjunction with reading a particular digitally-formatted work for perception by a user, create a condensed content description of said particular digitally-formatted work; and
compare the created condensed content description to the precompiled condensed content descriptions to determine whether said particular digitally-formatted work is subject to copy restrictions.

7. The computing system of claim 6, wherein the condensed content description corresponding to any given digitally-formatted work is a list of hash values, each hash value being calculated from a portion of the given digitally-formatted work using a hash function, wherein the computer-readable instructions on the one or more computer-readable media cause the one or more processors to change the hash function over time.

8. The computing system of claim 6, wherein:
the digitally-formatted works contain grammatical text;
the condensed content description corresponding to any given digitally-formatted work is a list of hash values; and
each hash value is calculated from a sequence of words that occurs in the given digitally-formatted work.

9. The computing system of claim 6, wherein:
the digitally-formatted works contain grammatical text;
the condensed content description corresponding to any given digitally-formatted work is a list of hash values;
each hash value is calculated from a sequence of words that occurs in the given digitally-formatted work; and
each sequence of words contains at least 100 characters.

10. The computing system of claim 6, wherein:
the digitally-formatted works contain grammatical text;
the condensed content description corresponding to any given digitally-formatted work is a list of hash values; and
the hash values are calculated in a way that allows comparison of ordered word sequences in the digitally-formatted works.

11. A system comprising means for performing acts comprising:
means for receiving precompiled condensed content descriptions of digitally-formatted works that are subject to copy restrictions;
in conjunction with reading a particular digitally-formatted work for perception on by a user, means for creating a condensed content description of said particular digitally-formatted work; and
means for comparing the created condensed content description to the precompiled condensed content descriptions to determine whether said particular digitally-formatted work is subject to copy restrictions.

12. A system comprising means as recited in claim 11, wherein the condensed content description corresponding to any given digitally-formatted work is a list of hash values, each hash value being calculated from a portion of the given digitally-formatted work using a hash function, the system further comprising means for changing the hash function over time.

13. A system comprising means as recited in claim 11, wherein:
the digitally-formatted works contain grammatical text;
the condensed content description corresponding to any given digitally-formatted work is a list of hash values; and
each hash value is calculated from a sequence of words that occurs in the given digitally-formatted work.

14. A system comprising means as recited in claim 11, wherein:
the digitally-formatted works contain grammatical text;
the condensed content description corresponding to any given digitally-formatted work is a list of hash values;
each hash value is calculated from a sequence of words that occurs in the given digitally-formatted work; and
each sequence of words contains at least 100 characters.

15. A system comprising means as recited in claim 11, wherein:
the digitally-formatted works contain grammatical text;
the condensed content description corresponding to any given digitally-formatted work is a list of hash values; and
the hash values are calculated in a way that allows comparison of ordered word sequences in the digitally-formatted works.

* * * * *